US012296852B1

(12) United States Patent
Zwiener et al.

(10) Patent No.: US 12,296,852 B1
(45) Date of Patent: May 13, 2025

(54) PULLOVERS INVOLVING BICYCLE LANES FOR AUTONOMOUS VEHICLES

(71) Applicant: Waymo LLC, Mountain View, CA (US)

(72) Inventors: Jakob Robert Zwiener, San Francisco, CA (US); Mingshen Chen, Stony Brook, NY (US); Daniella Gutlansky, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 307 days.

(21) Appl. No.: 17/739,280

(22) Filed: May 9, 2022

(51) Int. Cl.
*B60W 60/00* (2020.01)

(52) U.S. Cl.
CPC .. *B60W 60/0017* (2020.02); *B60W 60/00184* (2020.02); *B60W 2552/53* (2020.02); *B60W 2554/4041* (2020.02)

(58) Field of Classification Search
CPC ....... B60W 60/0017; B60W 60/00184; B60W 2552/53; B60W 2554/4041
USPC .......................................................... 701/23
See application file for complete search history.

(56) References Cited

U.S. PATENT DOCUMENTS

| | | | |
|---|---|---|---|
| 9,523,984 B1* | 12/2016 | Herbach | B60W 10/18 |
| 2015/0321641 A1* | 11/2015 | Abou Mahmoud | B60R 25/2018 701/2 |
| 2019/0049948 A1* | 2/2019 | Patel | G05D 1/0027 |
| 2019/0171206 A1* | 6/2019 | Abrams | G01C 21/3658 |
| 2022/0099450 A1* | 3/2022 | Pandit | G01C 21/3438 |
| 2022/0153286 A1* | 5/2022 | Chi | B60W 60/00256 |

* cited by examiner

*Primary Examiner* — Muhammad Shafi
(74) *Attorney, Agent, or Firm* — Botos Churchill IP Law LLP

(57) ABSTRACT

Aspects of the disclosure provide for selecting a pullover location for an autonomous vehicle. For instance, a set of potential pullover locations may be identified by, determining a plurality of rightmost points that the autonomous vehicle can reach, determining whether any of the rightmost points would result in the autonomous vehicle encroaching on a bicycle lane, and when any of the rightmost points encroaches on the bicycle lane, determining whether to adjust the location of that rightmost point. One of the set of potential pullover locations may be selected by assessing a cost of each potential pullover location of the set of potential pullover locations. The autonomous vehicle may be controlled to stop based on the selected one.

16 Claims, 18 Drawing Sheets

PULLOVERS INVOLVING BICYCLE LANES FOR AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of selecting a pullover location for an autonomous vehicle. The method includes identifying, by one or more processors a set of potential pullover locations by: determining a plurality of rightmost points that the autonomous vehicle can reach; determining whether any of the rightmost points would result in the autonomous vehicle encroaching on a bicycle lane, and when any of the rightmost points would result in at least a portion of the autonomous vehicle encroaching on the bicycle lane, determining whether to adjust a location of that rightmost point. The method also includes selecting, by the one or more processors, one of the set of potential pullover locations by assessing a cost of each potential pullover location of the set of potential pullover locations and controlling, by the one or more processors, the autonomous vehicle to stop at the selected one.

In one example, each of the rightmost points corresponds to a center of a rear axle of the autonomous vehicle, and wherein determining whether any of the rightmost points would result in the autonomous vehicle encroaching on a bicycle lane includes adding a halfwidth of the autonomous vehicle to each of the rightmost points. In another example, determining whether to adjust the location of that rightmost point includes determining a location of a lateral edge of the autonomous vehicle if the autonomous vehicle was stopped at that rightmost point. In this example, determining the location of the lateral edge of the autonomous vehicle includes adding a half-width of the autonomous vehicle to each of the rightmost points. In addition of alternatively, determining whether to adjust the location of that rightmost point includes determining whether the location of the lateral edge of the autonomous vehicle is within a threshold distance of an edge of the bicycle lane. In this example, the method also includes based on the determination of whether to adjust the location of that rightmost point includes adjusting the location of the rightmost point to an adjusted location within the threshold distance of the edge of the bicycle lane. In this example, the method also includes including the adjusted location in the set of potential pullover locations. In addition, the edge of the bicycle lane is an inside edge. Alternatively, the edge of the bicycle lane is an outside edge. In another example, determining the cost of each potential pullover location of the set of potential pullover locations includes assessing an encroachment cost based on whether each of the potential pullover locations of the set of potential pullover locations would result in the autonomous vehicle encroaching on the bicycle lane. In this example, the encroachment cost goes to zero when there is no encroachment on the bicycle lane. In addition, or alternatively, the encroachment cost is based on a width of the bicycle lane. In this example, the encroachment cost is further based on a desired portion of the width of the bicycle lane that is to remain unblocked by the autonomous vehicle. In addition, or alternatively, the encroachment cost is further based on an amount of encroachment on the bicycle lane.

Another aspect of the disclosure provides a system for selecting a pullover location for an autonomous vehicle. The system comprising one or more processors configured to identify a set of potential pullover locations by: determining a plurality of rightmost points that the autonomous vehicle can reach; determining whether any of the rightmost points would result in the autonomous vehicle encroaching on a bicycle lane, and when any of the rightmost points encroaches on the bicycle lane, determining whether to adjust a location of that rightmost point; and select one of the set of potential pullover locations by assessing a cost of each potential pullover location of the set of potential pullover locations. The one or more processors are further configured to control the autonomous vehicle to stop at the selected one.

In one example, the one or more processors are further configured to determine whether to adjust the location of that rightmost point by determining a location of a lateral edge of the autonomous vehicle if the autonomous vehicle was stopped at that rightmost point. In this example, the one or more processors are further configured to determine whether to adjust the location of that rightmost point by determining whether the location of the lateral edge of the autonomous vehicle is within a threshold distance of an edge of the bicycle lane. In addition, the one or more processors are further configured to, based on the determination of whether to adjust the location of that rightmost point includes, adjust the location of the rightmost point to an adjusted location within the threshold distance of the edge of the bicycle lane. In addition, the one or more processors are further configured to include the adjusted location in the set of potential pullover locations. In another example, the one or more processors are further configured to determine the cost of each potential pullover location of the set of potential pullover locations by assessing an encroachment cost based on whether each of the potential pullover locations of the set of potential pullover locations would result in the autonomous vehicle encroaching on the bicycle lane.

DETAILED DESCRIPTION

Overview

Figure 1:
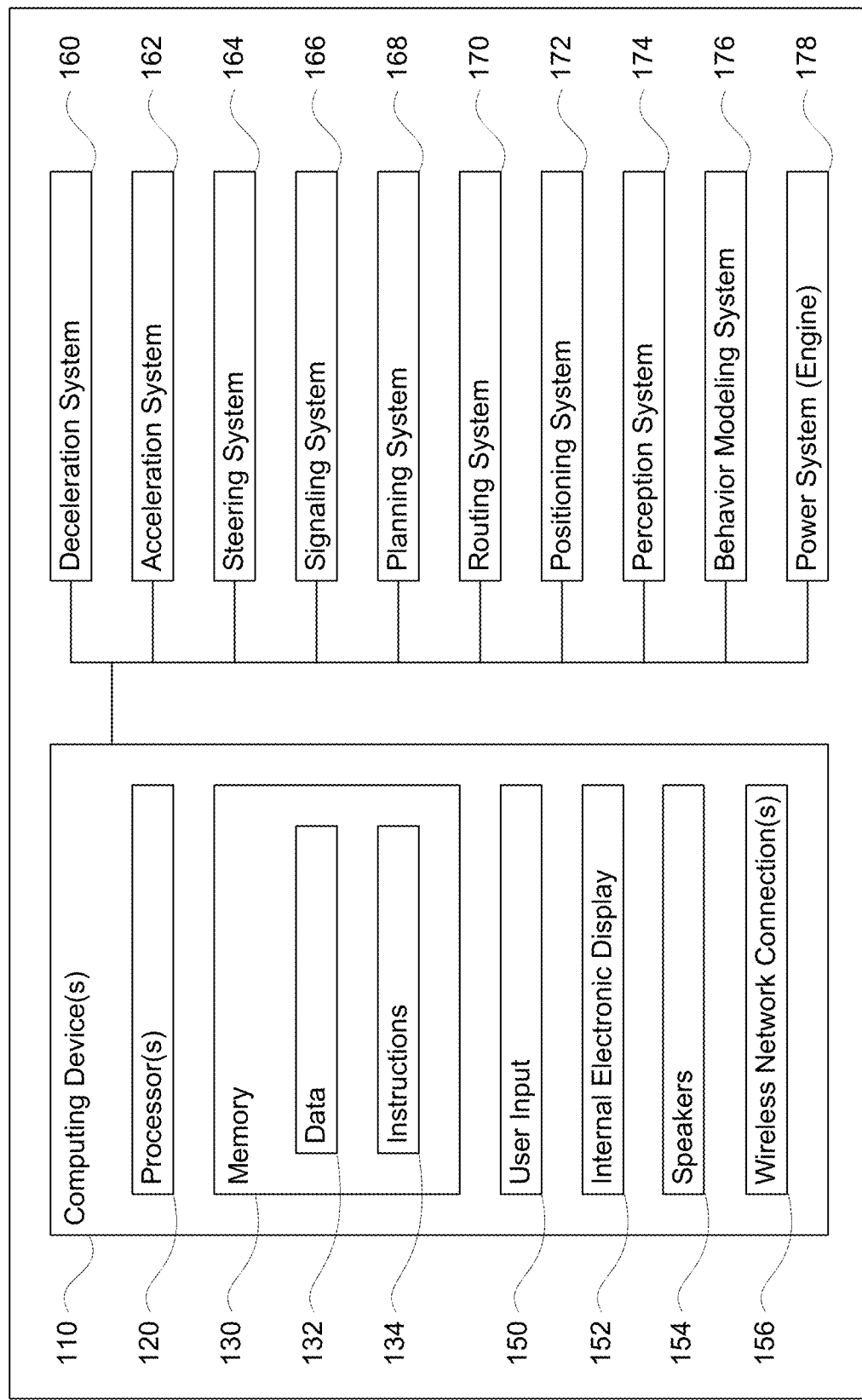
FIG. 1 is a functional diagram of an example vehicle in accordance with an exemplary embodiment.

The technology relates to enabling autonomous vehicles to better account for bicycle lanes when identifying and selecting pullover locations. For example, a typical approach may be to evaluate potentially pullover locations by identifying locations which enable the autonomous vehicle to get as far to the right (or left in left-hand drive countries) to the drivable road surface as possible. For example, as an autonomous vehicle approaches a destination, the autonomous vehicle's computing devices may identify potential pullover locations at predetermined distance intervals which are the closest to an edge of a drivable road surface (e.g. farthest to the right) while also taking into consideration the capabilities of the autonomous vehicle (i.e. what geometries is the autonomous vehicle able to follow which may depend upon the individual size and features of each autonomous vehicle). These potential pullover locations may then be evaluated using various factors to determine a cost for each potential pullover location.

The computing devices may then identify the pullover location with the lowest cost, and the autonomous vehicle may be controlled in order to pullover at the identified pullover location. However, in some instances, this may result in the autonomous vehicle selecting a pullover location which has the autonomous vehicle completely, or partially blocking the bicycle lane, for example because the autonomous vehicle has stopped farther to the right than needed. While, the evaluation may take into account avoiding bicycle lanes by assigning such pullover locations very high costs, this would not allow the autonomous vehicle's computing devices to recognize that staying to the left rather than as far right as possible in such locations may be the overall best location and may also result in an autonomous vehicle which may be unable to find a reasonable location to pullover.

To address these concerns, when initially identifying potential pullover locations, an autonomous vehicle may identify pullover locations based on how much those pullover locations would cause at least a portion of an autonomous vehicle to encroach on a bicycle lane. To do so, the autonomous vehicle's computing devices may first identify a section of road within a predetermined distance of the destination.

The autonomous vehicle's computing devices may then identify a set of potential pullover locations within the predetermined distance of the destination. Each potential pullover location of the set may be spaced at predetermined distance intervals along a driving lane.

For each predetermined distance interval, the autonomous vehicle's computing devices may identify a rightmost point to which the autonomous vehicle could drive and stop. In this regard, the actual location of this rightmost point may be determined based on the capabilities of individual autonomous vehicles. Such capabilities may include, for example, turning radius, dimensions including length and width, software and hardware configurations, limits on how close the autonomous vehicle can come to other objects while moving, limits on how close the autonomous vehicle can come to other objects while stopped, etc. The position of the autonomous vehicle when stopped at the rightmost point may be measured relative to a point on the autonomous vehicle, such as the center of the autonomous vehicle's rear axle or some other location. As such, in some instances, such as where there are other parked vehicles, the rightmost point may be within a driving lane, within a parking lane, or at locations therebetween.

Each rightmost point may be determined by finding a geometry the autonomous vehicle can achieve at each predetermined distance interval. Alternatively, the rightmost points may be determined by first finding a right-most geometry that the autonomous vehicle can follow and thereafter iterating along the right-most geometry at the predetermined distance intervals to find each rightmost point. In this example, the predetermined distance intervals may be measured along the rightmost driving lane as in the example above or alternatively may be measured along the rightmost geometry.

The autonomous vehicle's computing devices may determine if each rightmost point for each predetermined distance would result in the autonomous vehicle encroaching on a bicycle lane. If not, the rightmost point may be included in the set of potential pullover locations. If so, the autonomous vehicle's computing devices may determine the extent of that encroachment. For example, if the rightmost point would result in a left lateral edge of the autonomous vehicle being no more than a threshold distance from a leftmost edge of the bicycle lane, then the rightmost point may be included in the set of potential pullover locations. In addition, if the rightmost point would result in a right lateral edge of the autonomous vehicle being no more than the threshold distance from a rightmost edge of the bicycle lane, then the rightmost point may be included in the set of potential pullover locations.

This threshold distance may be dependent upon the width of the autonomous vehicle as well the expected or actual width of a bicycle lane as well as a desired amount of the bicycle lane which should remain unblocked when the autonomous vehicle is stopped. For example, for a given desired unblocked portion of a bicycle lane, the threshold distance will decrease as the width of the autonomous vehicle increases and as the width of the bicycle lane decreases. Similarly, for the given desired unblocked portion of a bicycle lane, the threshold distance will increase as the width of the autonomous vehicle decreases and the width of the bicycle lane increases.

The desired amount of unblocked bicycle lane may be selected based upon the goals of the transportation system, characteristics of the autonomous vehicles, and other considerations. For instance, for autonomous vehicles with typical doors which pivot open laterally, the desired amount of unblocked bicycle lane may be greater than for autonomous vehicles with sliding doors where less lateral clearance may be needed. This, in combination with notifications to passengers within an autonomous vehicle who will be exiting the autonomous vehicle, may help to reduce instances of opening a door into and/or causing a conflict with a bicyclist. As another instance, legal requirements for stopping outside or within bicycle lanes may require greater amounts of or completely unblocked bicycle lanes.

If the rightmost point would result in the left or right edges of the autonomous vehicle being is greater than the threshold distance of both of the rightmost and leftmost edges of the bicycle lane, then the location of this rightmost point may be adjusted leftward until the adjusted point is within the threshold distance of the leftmost edge. This adjusted point may then be included in the set of potential pullover locations. In this regard, if at any of the rightmost points within the threshold distance of the destination would result in the autonomous vehicle overlapping the bicycle lane too much, then the autonomous vehicle would not stop at those rightmost points. Rather, the rightmost point is adjusted to a new location where the autonomous vehicle would not overlap with the bicycle lane too much.

The set of potential pullover locations may then be analyzed in order to select an actual pullover location for the autonomous vehicle to stop. For instance, each potential pullover location may be analyzed using a typical cost-based assessment for selecting a pullover location. For example, the assessment may include determining and aggregating a plurality of costs for various characteristics of the potential pullover location. Such characteristics may include an achievable lateral offset from an object, distance to the destination, type of pullover location, inconvenience to other road users, and so on. The pullover location having the lowest cost may then be selected for the actual pullover location. Thereafter, this actual pullover location may be set at the destination for the autonomous vehicle, and the autonomous vehicle may be controlled to reach this destination.

In instances where a potential pullover location requires that at least a portion of an autonomous vehicle encroaches on a bicycle lane, an additional "encroachment cost" may be added. The encroachment cost may increase the overall cost for a potential pullover location and may function to discourage stopping at locations which would result in the autonomous vehicle encroaching on bicycle lanes while still allowing for autonomous vehicles to select and stop in pullover locations which would result in the autonomous vehicle encroaching on a bicycle lane when no lower cost potential pullover location is available.

The features described herein may better enable autonomous vehicles to better account for bicycle lanes when identifying and selecting pullover locations. For instance, an autonomous vehicle is able to find and use potential pullover locations which provide a desired amount of unblocked bicycle lanes and/or completely avoid bicycle lanes rather than those that simply completely block bicycle lanes. In addition, when assessing costs, an encroachment cost may be used to further this benefit by discouraging selection of pullover locations which would result in the autonomous vehicle encroaching on bicycle lanes while at the same time still allowing for them. In addition, the features described herein may allow the autonomous vehicle's computing devices to recognize that staying on the left rather than as far right as possible in such locations may be the overall best location. As such, an autonomous vehicle may be better able to find reasonable locations to stop to pick up and/or drop off passengers. Thus, these features may be particularly useful in more urban areas where available pullover locations can be scarce.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g., garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
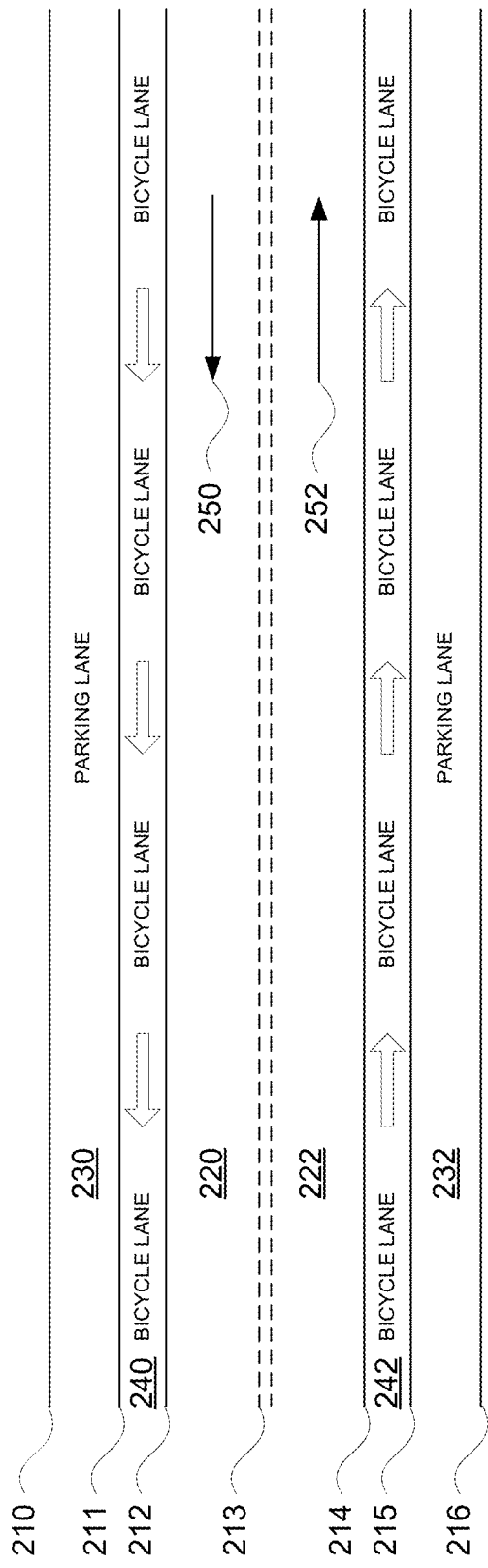
FIG. 2 is an example of map information in accordance with aspects of the disclosure.

FIG. 2 is an example of map information 200 for a geographic location corresponding to a small section of roadway. The map information 200 that includes information identifying the shape, location, and other characteristics of lane features such as curbs 210, 216, fog lines or lines that delineate bicycle lane edges 211, 212, 214, 215, and more typical lane lines such as dashed lines 213 (e.g., yellow lane lines dividing lanes of different traffic directions), etc. These lane features may define the shape and boundaries of driving lanes 220, 222, parking lanes 230, 232, and bicycle lanes 240, 242. Although not shown, the map information also includes other features of the intersections such as traffic control devices including traffic signal lights, stop signs, yield signs, speed limit signs, informational signs, and so on. In addition to the aforementioned features and information, the map information may also include information that identifies the direction of traffic for each lane, as represented by arrows 250, 252, as well as information that allows the computing devices 110 to determine whether the vehicle has the right of way to complete a particular maneuver (i.e., complete a turn or cross a lane of traffic or intersection). In this regard, the map information 200 may identify various features which the autonomous vehicle 100's systems may use to localize the autonomous vehicle as well as to generate routes to a destination and trajectories to follow in order to reach that destination.

The map information 200 may also identify pullover locations which may include areas where a vehicle is able to stop and to pick up or drop off passengers or cargo. These areas may correspond to parking spaces, waiting areas, shoulders, parking lots, etc. These pullover locations may correspond to larger parking areas (without specifically delineated parking spaces) such as the parking lanes 230, 232, or more finite parking or stopping location such as parking spaces. In this regard, the pullover areas in the map information may correspond to any type of area in which a vehicle may be permitted to stop to pick up and drop off passengers or cargo such as no parking zones, congestion zones, loading zones, drop off or pick up zones (e.g., for airports or train stations), curb cuts (e.g., areas in a curb that allow a wheel chair, bicycle, stroller or other wheeled device to pass through easily) where an autonomous vehicle may pullover and/or stop, etc. In this regard, pullover locations may be determined using heuristics, such as every 1 meter or more or less within a designated parking area and may be updated periodically, for instance every week or more or less, based on locations where vehicles of the fleet or other vehicles are observed being stopped or pulled over.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge or rather, a direction of traffic flow. The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
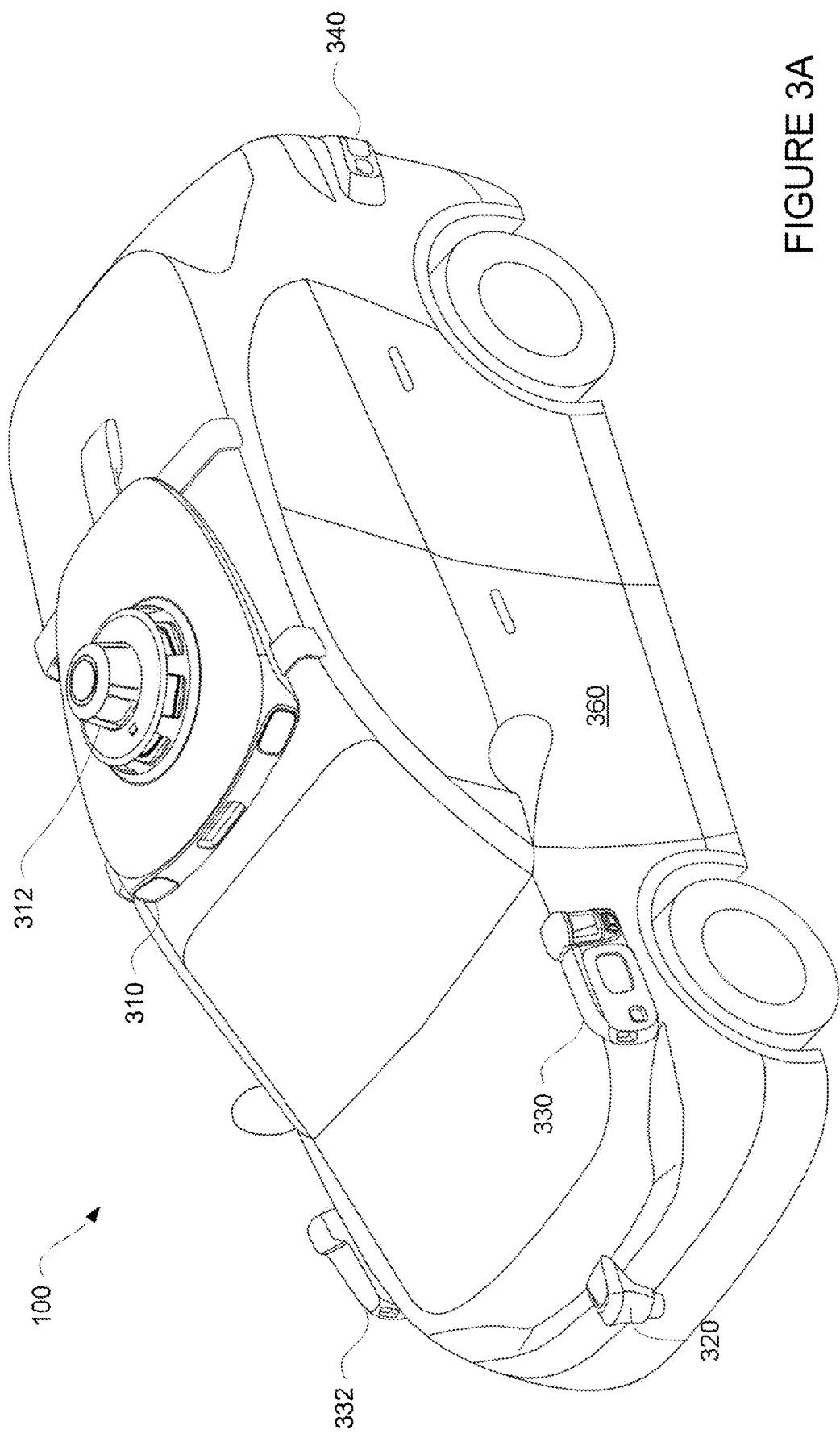
FIG. 3A-3B are example external views of a vehicle in accordance with aspects of the disclosure.
Figure 3B:
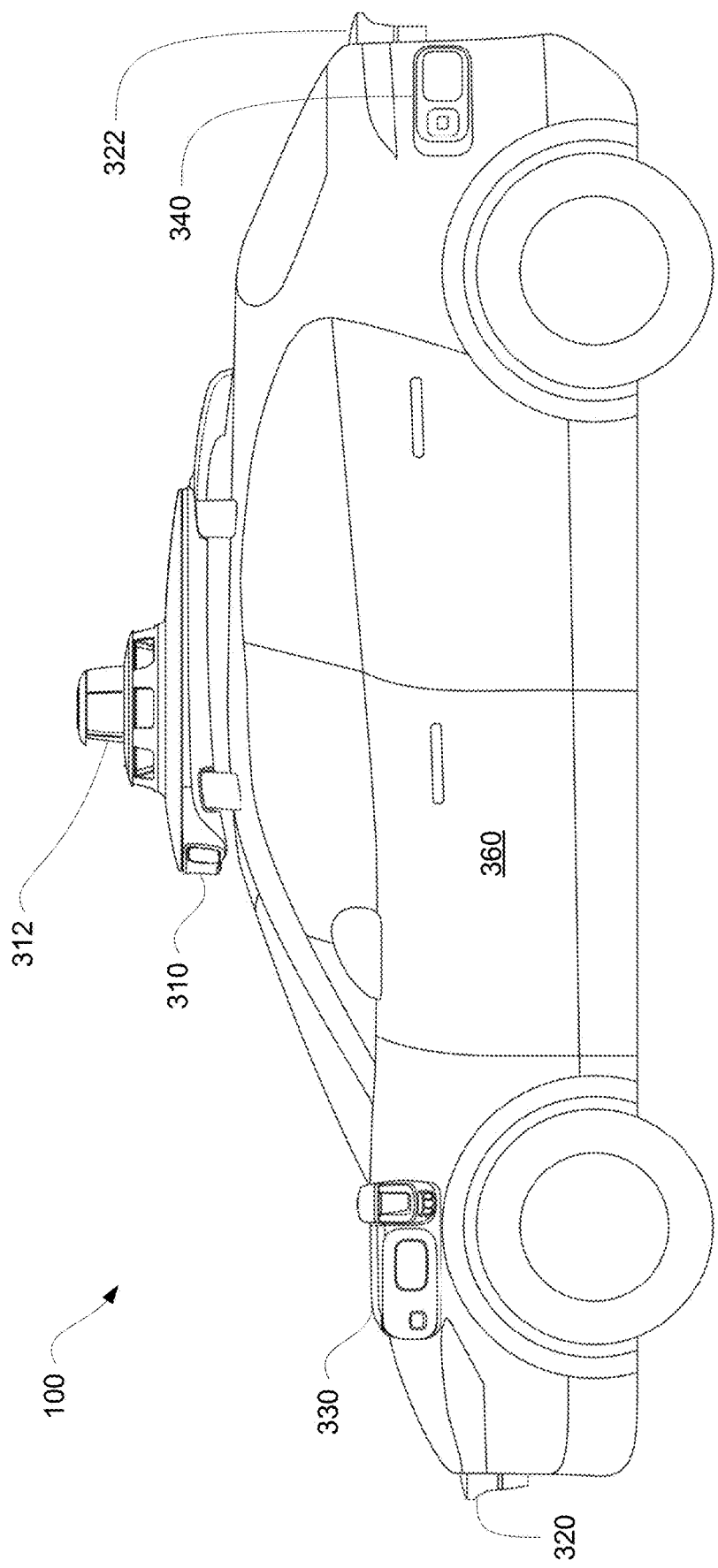

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 12:
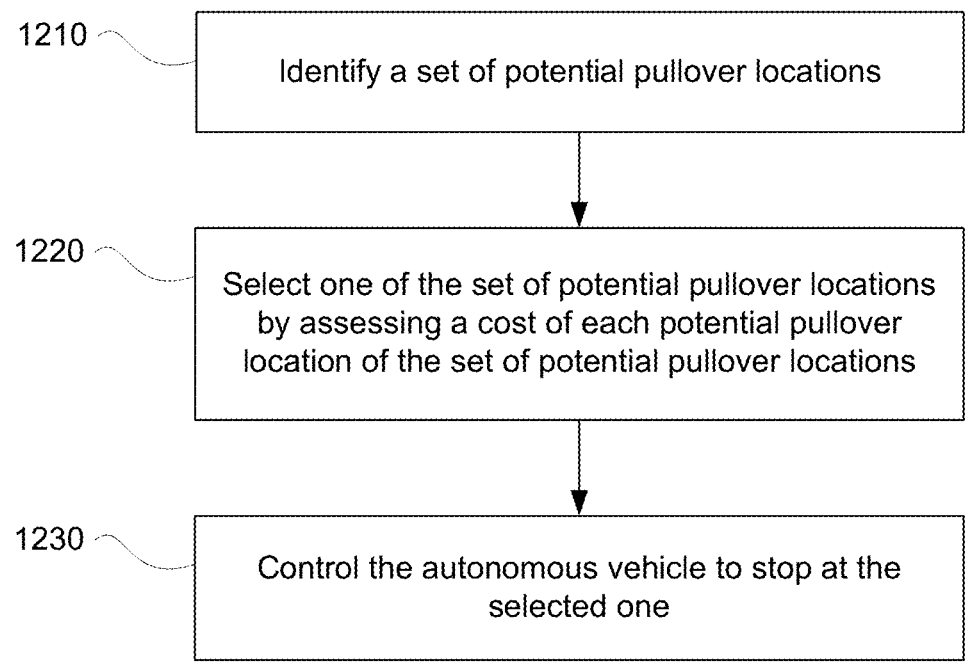
FIG. 12 is an example flow diagram in accordance with aspects of the disclosure.

FIG. 12 provides an example flow diagram 1200 for selecting a pullover location for an autonomous vehicle, which may be performed by one or more processors, such as the one or more processors of the computing devices 110. As shown in block 1210 a set of potential pullover locations is identified.

When initially identifying potential pullover locations (prior to evaluating the costs), the computing devices 110 may identify pullover locations based on how much those pullover locations would cause at least a portion of an autonomous vehicle to encroach on a bicycle lane. To do so, the autonomous vehicle's computing devices may first identify a section of road within a predetermined distance of the destination. This predetermined distance may be 50 meters or more or less.

Figure 4:
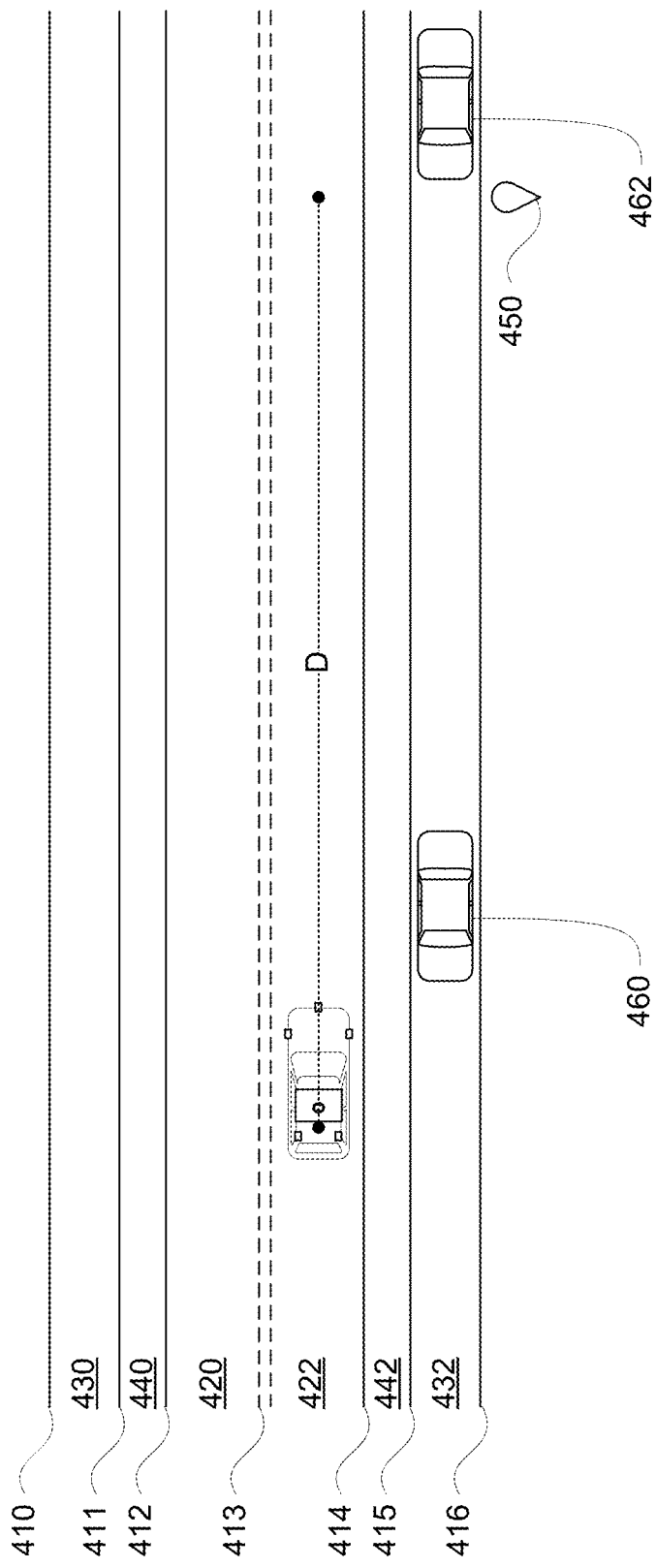
FIG. 4 is an example of a geographic area corresponding to the map information for FIG. 2.

FIG. 4 is an example of a geographic area 400 corresponding to the map information for FIG. 2. FIG. 4 includes features such as curbs 410, 416 corresponding to curbs 210, 216, bicycle lane edges 411, 412, 414, 415 corresponding to bicycle lane edges 211, 212, 214, 215, dashed lines 413 corresponding to dashed lines 213, driving lanes 420, 422 corresponding to driving lanes 220, 222, parking lanes 430, 432 corresponding to parking lanes 230, 232, and bicycle lanes 440, 442 corresponding to bicycle lanes 240, 242. In this example, autonomous vehicle 100 is depicted traveling in driving lane 422. The autonomous vehicle is approaching a destination represented by marker 450 and is a predetermined distance D from the destination. In this example, the distance D is measured along the center of the driving lane 422. As shown, this distance is measured relative to a point on the autonomous vehicle, such as the center of the autonomous vehicle's rear axle, although some other location on the autonomous vehicle such as a front or rear bumper may also or alternatively be used. FIG. 4 also depicts vehicles 460, 462 parked in the parking lane 432.

Figure 5:
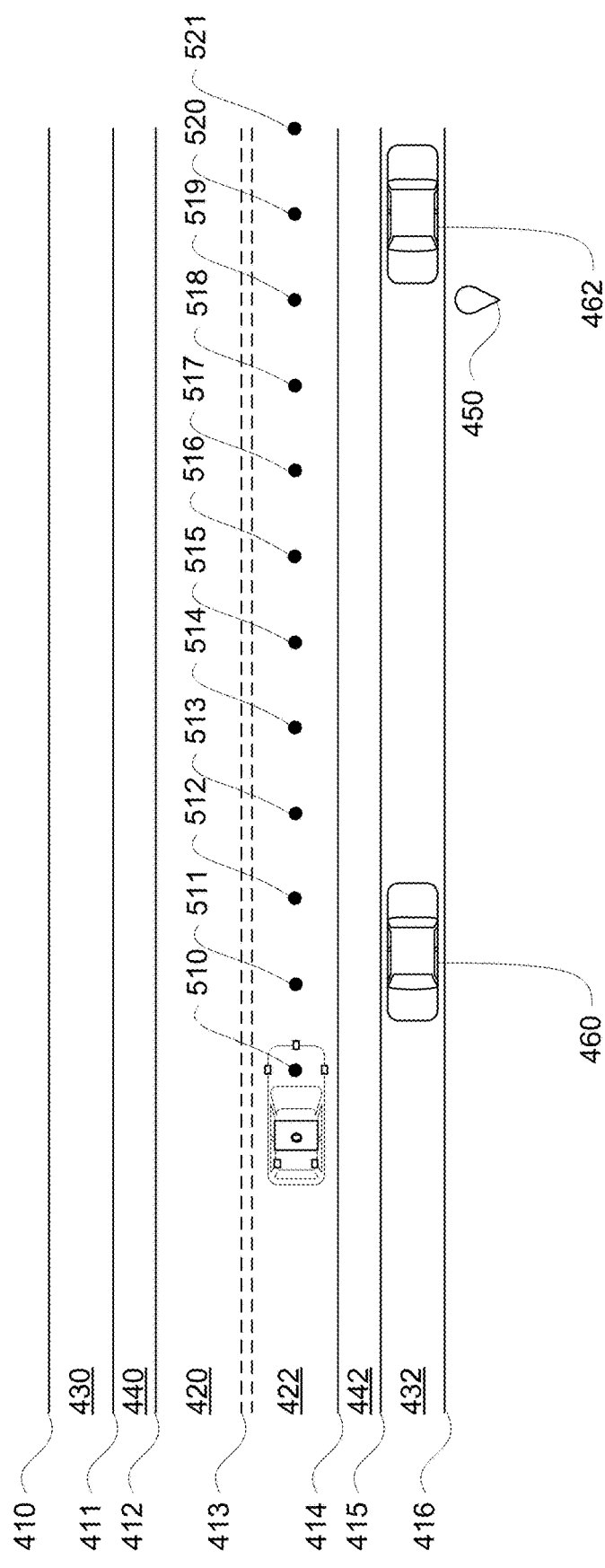
FIG. 5 is an example of a plurality of locations at predetermined distance intervals in accordance with aspects of the disclosure.

The computing devices 110 may then identify a set of potential pullover locations within the predetermined distance of the destination. Each potential pullover location of the set may be spaced at predetermined distance intervals along a driving lane. For example, these predetermined distance intervals may be 1 meter, 1.5 meters, or more or less, measured along a centerline of a rightmost driving lane. Alternatively, two-dimensional (e.g., for an area rather than a point) sampling or higher dimensional (e.g., 3D or angular) sampling could be used. FIG. 5 corresponds to the example of FIG. 4, and depicts a plurality of locations 510, 511, 512, 513, 514, 515, 516, 517, 518, 519, 520, 521 at predetermined distance intervals along the driving lane 422. As will be appreciated, the predetermined distance intervals depicted are greater than 1 or 1.5 meters for ease of representation and understanding.

Figure 13:
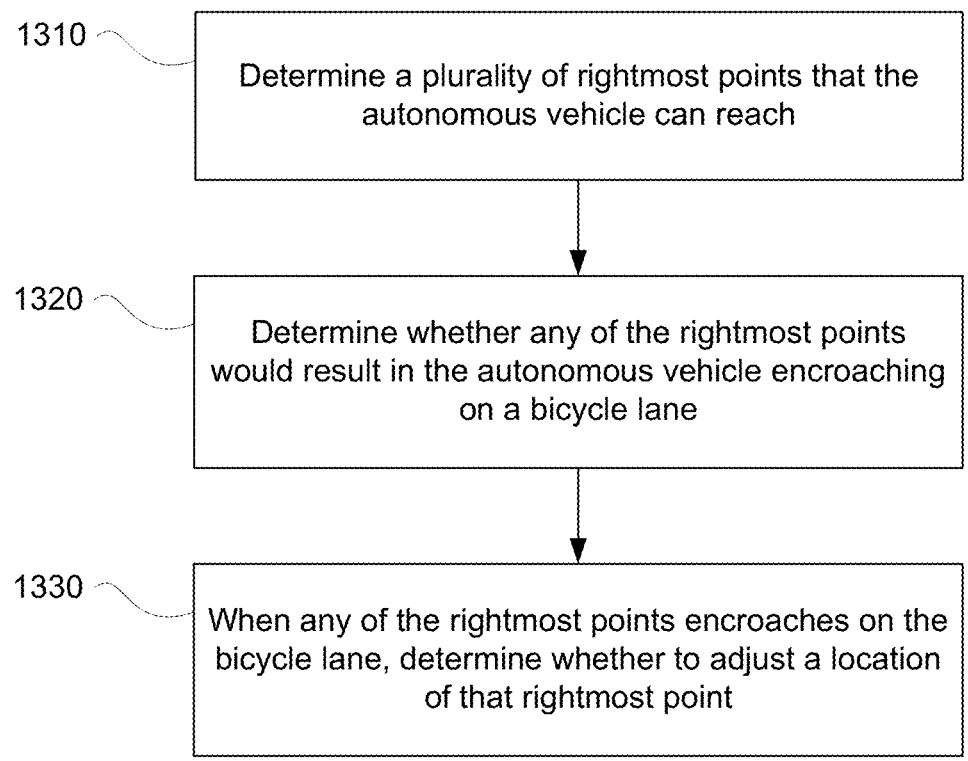
FIG. 13 is an example flow diagram in accordance with aspects of the disclosure.

FIG. 13 provides an example flow diagram 1300 for identifying a set of potential pullover locations corresponding to block 1210 in FIG. 12. For example, at block 1310, a plurality of rightmost points that the autonomous vehicle can reach are determined. For instance, for each predetermined distance interval, the computing devices 110 may identify a rightmost point to which the autonomous vehicle could drive and stop. In this regard, the actual location of this rightmost point may be determined based on the capabilities and dimensions of individual autonomous vehicles and may define a right offset value measured from a center of a lane (e.g., a right-most lane). Alternatively, the right offset value may be measured from the edge of a drivable road surface (e.g., the edge of a parking lane, paved surface, curb, shoulder area, etc.). Such capabilities may include, for example, turning radius, dimensions including length and width, software and hardware configurations, limits on how close the autonomous vehicle can come to other objects while moving, limits on how close the autonomous vehicle can come to other objects while stopped (e.g., additional distance may be needed to open the autonomous vehicle's doors when stopped), etc. The position of the autonomous vehicle when stopped at the rightmost point may be measured relative to a point on the autonomous vehicle, such as the center of the autonomous vehicle's rear axle or some other location. As such, in some instances, such as where there are other parked vehicles, the rightmost point may be within a driving lane (i.e., double parking), within a parking lane, or at locations therebetween.

Figure 6:
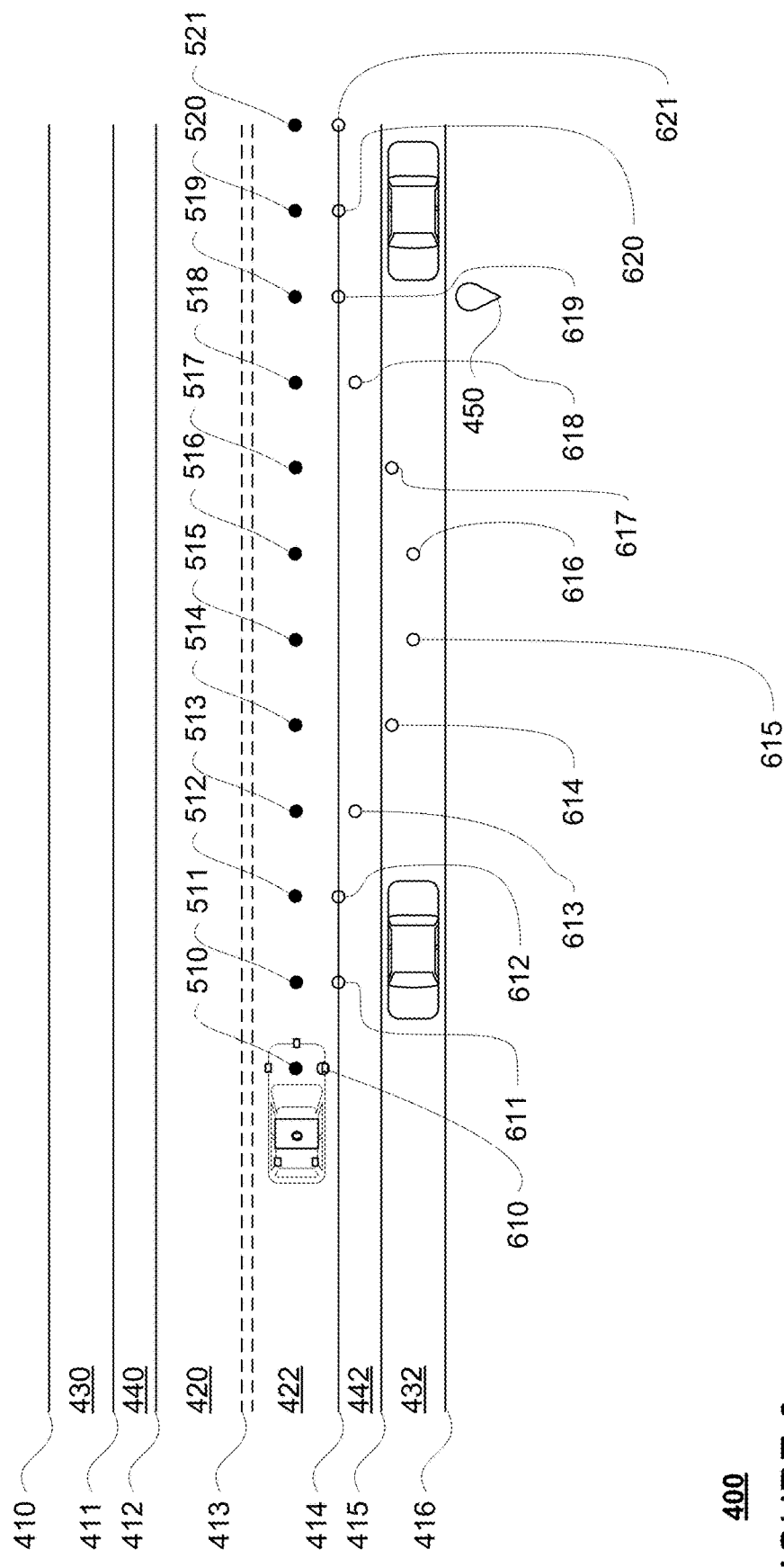
FIG. 6 is an example of a plurality of rightmost points in accordance with aspects of the disclosure.

FIG. 6 is an example of a plurality of rightmost points 610, 611, 612, 613, 614, 615, 616, 617, 618, 619, 620, 621 corresponding to each of the plurality of locations 510, 511, 512, 513, 514, 515, 516, 517, 518, 519, 520, 521, respectively, in accordance with aspects of the disclosure. Each of these rightmost points is a location to which the autonomous vehicle 100 could drive and stop when taking into account the capabilities and dimensions of the autonomous vehicle 100 as well as the locations and positions of the vehicles 460, 462. Each of these rightmost points are again measured from the center of the rear axle of the autonomous vehicle 100 and define a right offset value from the driving lane 422.

Figure 7:
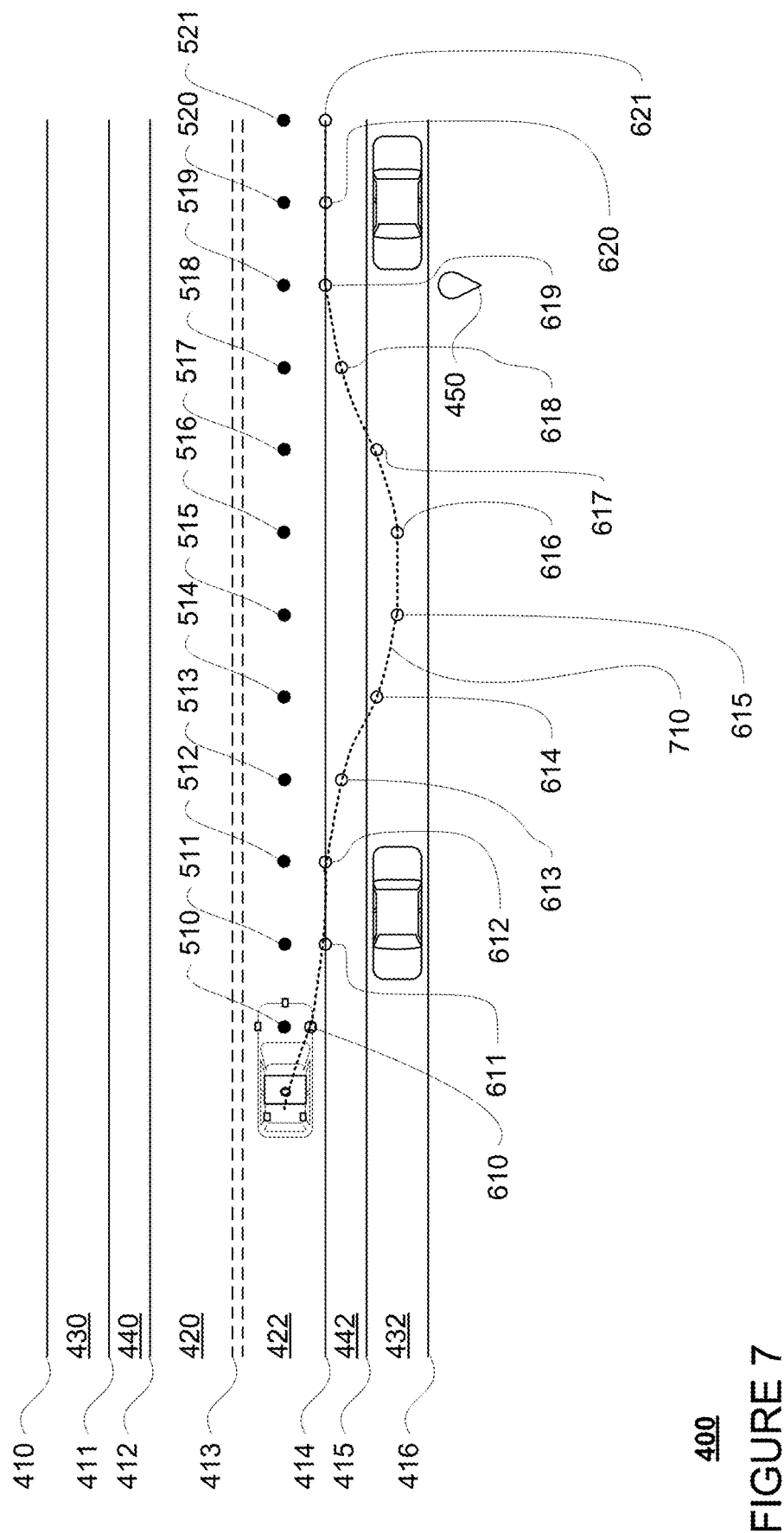
FIG. 7 is an example of a curve corresponding to a geometry achievable by the autonomous vehicle in accordance with aspects of the disclosure.

Each rightmost point may be determined by the computing devices 110 by finding a geometry the autonomous vehicle can achieve at each predetermined distance interval (i.e., one geometry for each rightmost point). Alternatively, the rightmost points may be determined by first finding a right-most geometry that the autonomous vehicle can follow and thereafter iterating along the right-most geometry at the predetermined distance intervals to find each rightmost point. In this example, the predetermined distance intervals may be measured along the rightmost driving lane as in the example above or alternatively may be measured along the rightmost geometry. As an example, FIG. 7 is an example of a curve 710 corresponding to a geometry achievable by the autonomous vehicle in accordance with aspects of the disclosure.

Returning to block 1320 of FIG. 13, whether any of the rightmost points would result in the autonomous vehicle encroaching on a bicycle lane is determined. The computing devices 110 may determine if each rightmost point for each predetermined distance would result in any portion of the autonomous vehicle encroaching on a bicycle lane. If not, the rightmost point may be included in the set of potential pullover locations. If so, the autonomous vehicle's computing devices may determine the extent of that encroachment. For example, if the rightmost point is to the left of the bicycle lane or within the bicycle lane and would result in a right lateral edge of the autonomous vehicle being no more than a threshold distance from a leftmost edge (e.g., either an inside or outside edge of a lane line boundary defining the leftmost edge) of the bicycle lane, then the rightmost point may be included in the set of potential pullover locations.

Figure 8:
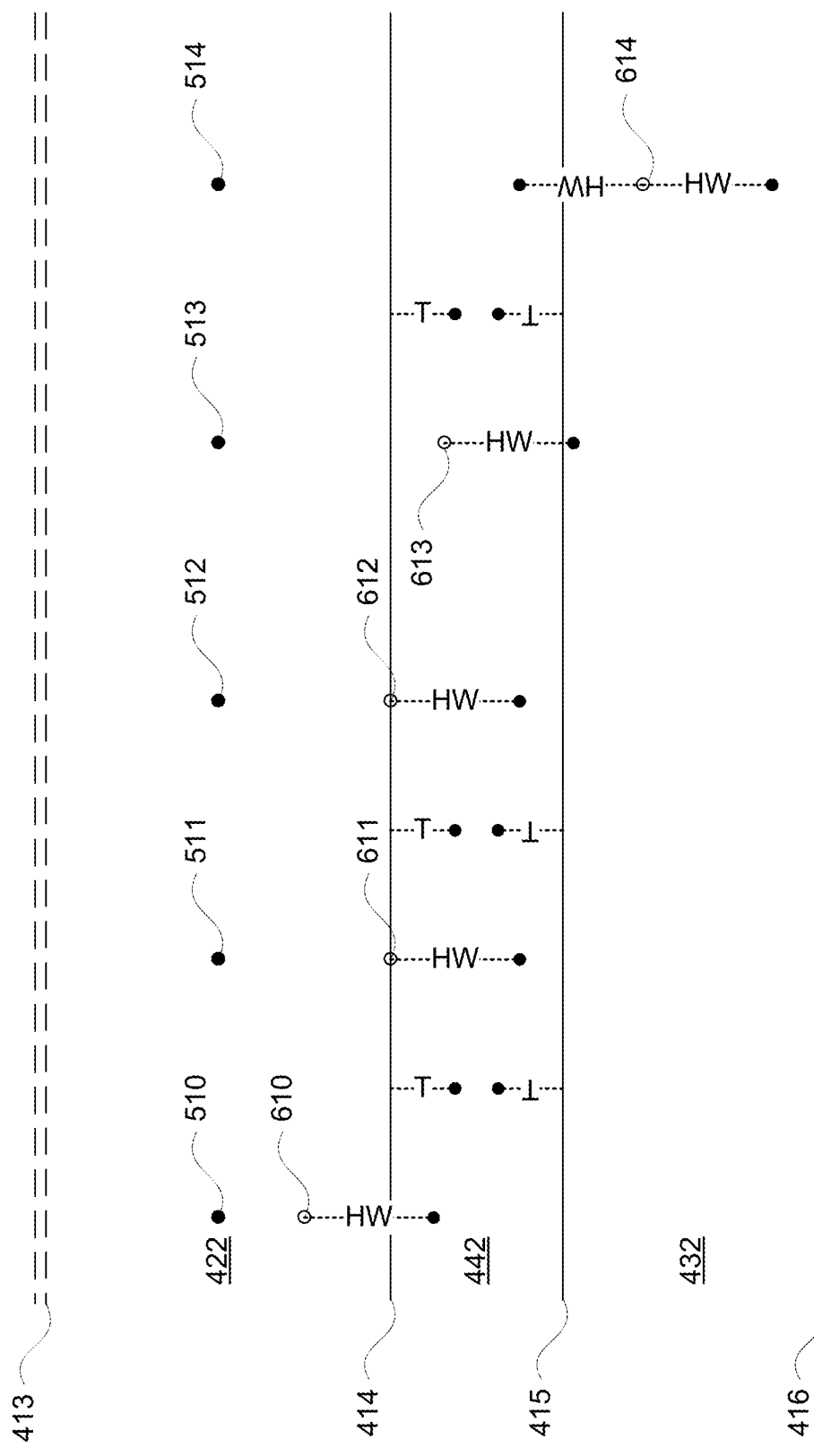
FIG. 8 is a detail view of a bicycle lane, rightmost points, a half-width of an autonomous vehicle, and a threshold in accordance with aspects of the disclosure.

FIG. 8 is an example detail view 800 of bicycle lane 442 and depicts (as an example) rightmost points 610, 611, 612, 613, 614 as well as half-width (HW) distances of an autonomous vehicle 100 with respect to such rightmost points. In the example of rightmost points 610, 611, 612, 613 which are either to the left of or within the bicycle lane, the half width distances extend into the bicycle lane 442. In this example, a threshold distance T1 is represented with respect to each of the edges of the bicycle lane 442. In this regard, T1 may be implemented as a positive value on the left edge of the bicycle lane and a negative value on the right edge of the bicycle lane, but in either case may be a non-zero value. As depicted, only the rightmost point 610 would result in a right lateral edge of the autonomous vehicle (measured based on the half width distance HW as well as the orientation/angle for autonomous vehicle 100 with respect to the lane or road edge) being no more than the threshold distance T1 from the leftmost edge (bicycle lane edge 414). As such, the rightmost point 610 may be included in the set of potential pullover locations.

In addition, when the rightmost point is within the bicycle lane or to the right of the bicycle lane, the above calculations may be reversed. For instance, if the rightmost point would result in a left lateral edge of the autonomous vehicle being no more than the threshold distance from a rightmost edge (e.g., either an inside or outside edge of a lane line boundary defining the rightmost edge) of the bicycle lane, then the rightmost point may be included in the set of potential pullover locations. For example, a threshold distance T1 is represented with respect to each of the edges of the bicycle lane 442. In this example, only the rightmost point 614 is to the right of the bicycle lane and would also result in a left lateral edge of the autonomous vehicle (measured based on the half width distance HW for autonomous vehicle 100) being no more than the threshold distance T1 from the rightmost edge (bicycle lane edge 415). As such, the rightmost point 614 may be included in the set of potential pullover locations. Accordingly, each of the rightmost points 611, 612, 613 may be determined to result in at least a portion of the autonomous vehicle encroaching on the bicycle lane 442.

The threshold distance may be dependent upon the width (or halfwidth) of the autonomous vehicle as well the expected (e.g., defined in map information) or actual (i.e., detected by the autonomous vehicle's perception system) width of a bicycle lane as well as a desired amount of the bicycle lane which should remain unblocked when the autonomous vehicle is stopped (a desired unblocked portion of bicycle lane). For example, for a given desired unblocked portion of a bicycle lane, the threshold distance will decrease as the width of the autonomous vehicle increases and as the width of the bicycle lane decreases. Similarly, for the given desired unblocked portion of a bicycle lane, the threshold distance will increase as the width of the autonomous vehicle decreases and the width of the bicycle lane increases.

The desired amount of unblocked bicycle lane may be selected based upon the goals of the transportation system, characteristics of the autonomous vehicles, and other considerations. For instance, for autonomous vehicles with typical doors which pivot open laterally (e.g., typical car doors), the desired amount of unblocked bicycle lane may be greater than for autonomous vehicles with sliding doors (e.g., minivan doors) where less lateral clearance may be needed. This, in combination with notifications to passengers within an autonomous vehicle who will be exiting the autonomous vehicle, may help to reduce instances of opening a door into and/or causing a conflict (e.g., an actual collision or near collision) with a bicyclist. As another instance, legal requirements (e.g., local or regional traffic laws or rules) for stopping in bicycle lanes may require greater amounts of or even completely unblocked bicycle lanes.

Figure 9:
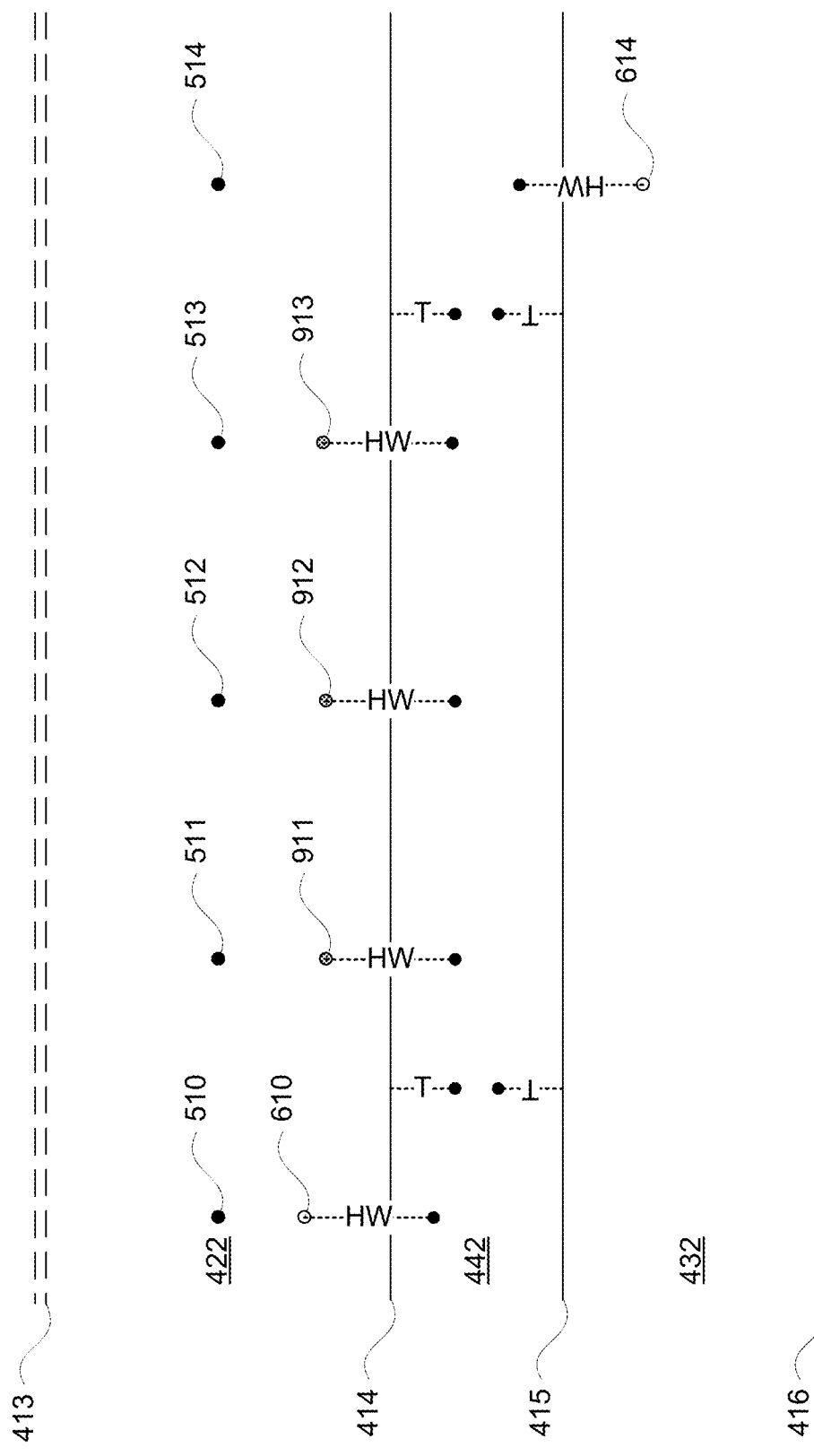
FIG. 9 is a detail view of a bicycle lane, rightmost points, adjusted points, a half-width of an autonomous vehicle, and a threshold in accordance with aspects of the disclosure.

Returning to block 1330 of FIG. 13, when any of the rightmost points would result in any portion of the autonomous vehicle encroaching on the bicycle lane, whether to adjust a location of that rightmost point is determined. For instance, based on the amount or extent of the encroachment, the computing devices may adjust the location of a rightmost point. For example, if the rightmost point would result in the left or right edges of the autonomous vehicle being is greater than the threshold distance of one or both of the right and left-most edges of the bicycle lane as discussed above, then the location of this rightmost point may be adjusted leftward (e.g., back towards the rightmost driving lane) until the adjusted point is within the threshold distance of the leftmost edge. Returning to FIG. 8, each of the rightmost points 611, 612, 613 may be determined to result in the autonomous vehicle encroaching on the bicycle lane 442 beyond the threshold distance and may therefore be adjusted to the locations of adjusted points 911, 912, 913, respectively as shown in FIG. 9.

In this regard, the right offset values for any adjusted points will be decreased (e.g., when measured from the center of a lane). In other words, the lateral distances from the center of lane for each of the adjusted points 911, 912, 913 is less than the lateral distances from the lane 442 for each of the rightmost points 611, 612, 613, respectively. Any adjusted points may then be included in the set of potential pullover locations. As such, in addition to the rightmost points 610, 614 as well as adjusted points 911, 912, 913 may be included in the set of potential pullover locations, and rightmost points 611, 612, 613 would not. Thus, the computing devices 110 may iterate through each of the rightmost points, including those not depicted in FIGS. 8 and 9 (e.g., right most points 615, 616, 617, 618, 619, 620, 621).

Figure 10:
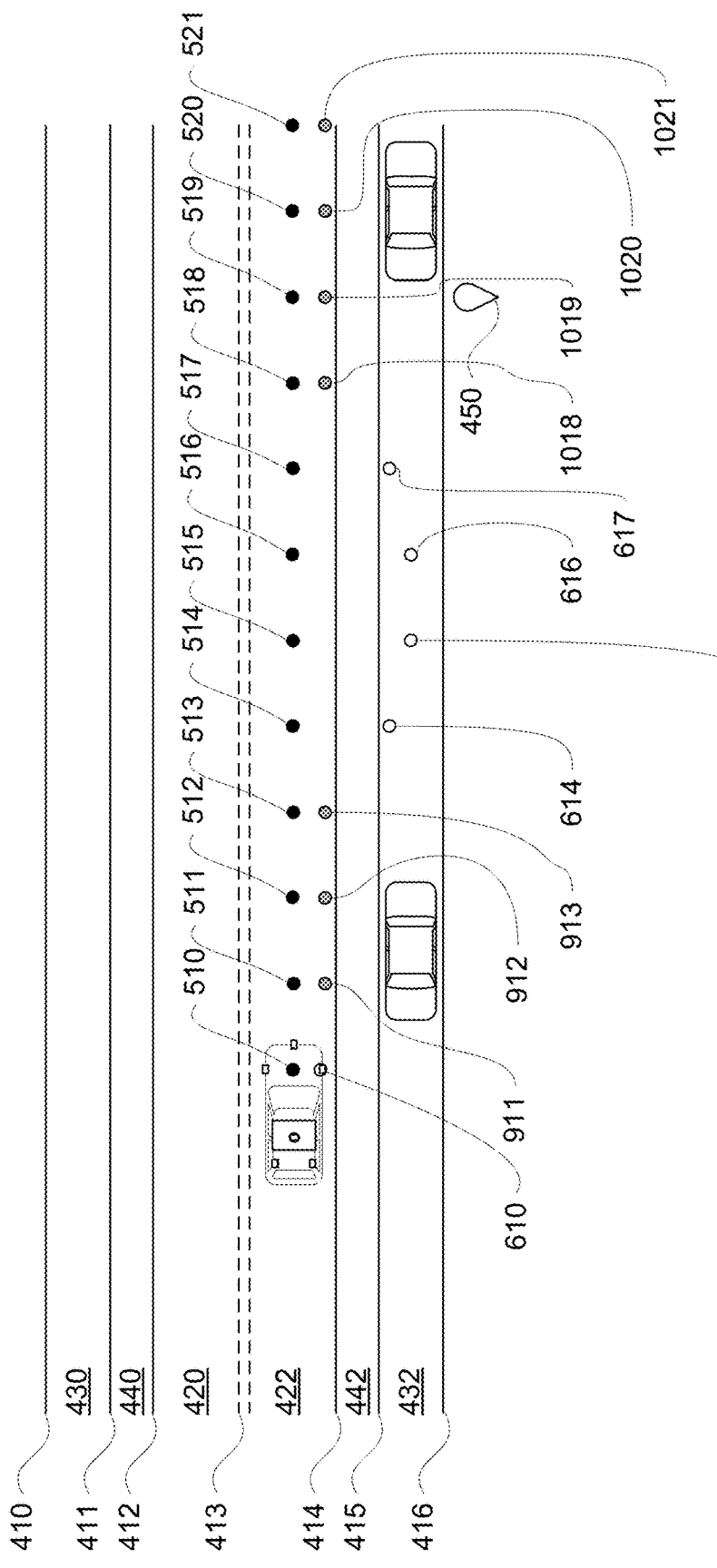
FIG. 10 is an example of a set of potential pullover locations in accordance with aspects of the disclosure.

In this regard, if at any of the rightmost points within the threshold distance of the destination would result in the autonomous vehicle overlapping the bicycle lane too much, then the autonomous vehicle would not stop at those rightmost points. Rather, the rightmost point is adjusted to a new location where the autonomous vehicle would not overlap with the bicycle lane too much (e.g., more than the threshold distance from the left or right bicycle lane edges) or at all, depending upon the desires of the transportation service. For example, FIG. 10 depicts an example of a set of potential pullover locations (for the example of FIGS. 8 and 9) including the rightmost points 611, 614, adjusted points 911, 912, 913, rightmost points 615, 616, 617, as well as adjusted points 1018, 1019, 1020, 1021 (corresponding to adjusted locations for each of rightmost points 618, 619, 620, 621, respectively).

Returning to block 1220 of FIG. 12, one of the set of potential pullover locations is selected by assessing a cost of each potential pullover location of the set of potential pullover locations. The set of potential pullover locations may be analyzed in order to select an actual pullover location for the autonomous vehicle to stop. For instance, each potential pullover location may be analyzed using a typical cost-based assessment for selecting a pullover location. For example, the assessment may include determining and aggregating a plurality of costs for various characteristics of the potential pullover location. Such characteristics may include an achievable lateral offset from an object (e.g., how close the autonomous vehicle is allowed to get to an object such as a curb), distance to the destination (e.g., linear distance, walking distance to the destination, type of pullover location (e.g., parking spot vs double parking), inconvenience to other road users, and so on. The pullover location having the lowest cost may then be selected for the actual pullover location.

Figure 11:
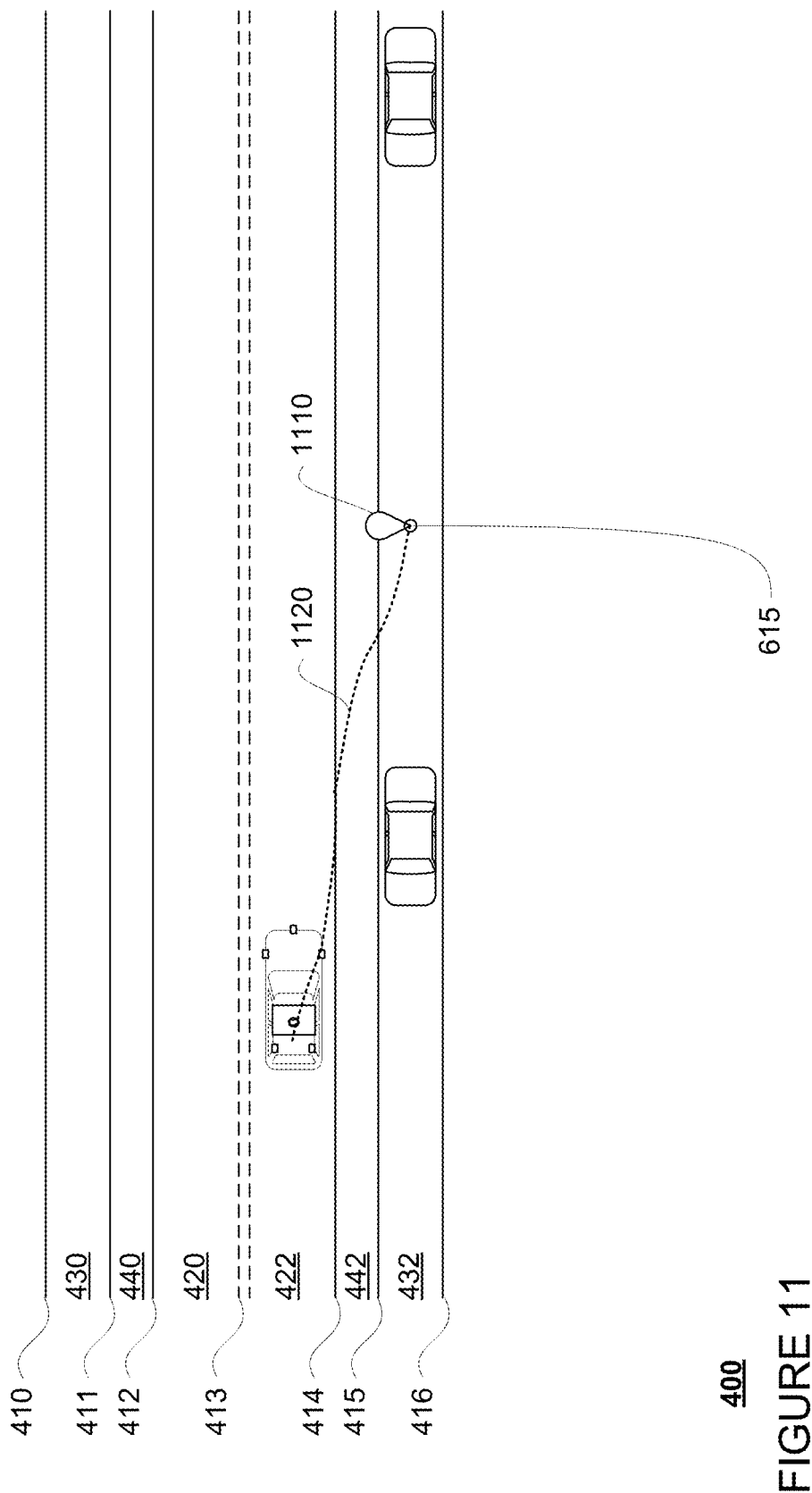
FIG. 11 is an example of a selected pullover location and a route in accordance with aspects of the disclosure.

FIG. 11 is an example of a selected pullover location 1110 and a route 1120 in accordance with aspects of the disclosure. For example, after evaluating the costs of all of the pullover locations of the set (as depicted in FIG. 10), the computing devices 110 in this example, may have determined that the rightmost point 615 has the lowest cost among rightmost points 610, 614, 615, 616, 617 and adjusted points 911, 912, 913, 1018, 1019, 1020, 1021. Thus, rightmost point 615 is selected as the pullover location 1110. However, if the rightmost point 615 has a higher cost for some other reason, for instance because it becomes occupied by another object (e.g., a pedestrian), then one of the adjusted points 911, 912, 913, 1018, 1019 may be selected.

Returning to block 1230 of FIG. 12, the autonomous vehicle is controlled to stop at the selected one. For instance, the actual pullover location may be set at the destination for the autonomous vehicle, and the autonomous vehicle may be controlled to reach this destination as described above. In this regard, the autonomous vehicle is controlled according to the right offset of the selected pullover location. Thus, referring back to FIG. 11, the autonomous vehicle 100 may be controlled according to the right offset value of the rightmost point 615 (or an alternative rightmost point). For example, the routing system 170 may plan the route 1120 in order for the autonomous vehicle to reach the pullover location 1110, and the planning system 168 may use this route to plan trajectories in order to stop the autonomous vehicle at the pullover location.

In instances where a potential pullover location would result in at least a portion of an autonomous vehicle encroaching on a bicycle lane, an additional "encroachment cost" may be added. For example, given a desired unblocked portion of bicycle lane of width d, width of the bicycle lane w, and current furthest encroachment distance by the autonomous vehicle e, an encroachment cost c may be determined according to the equation:

$$c = \max\{0, -(w-e-d)\}.$$

In this regard, if there is no encroachment, the encroachment cost goes to zero. The encroachment cost may increase the overall cost for a potential pullover location and may function to discourage stopping at locations which would result in the autonomous vehicle encroaching on bicycle lanes while still allowing for autonomous vehicles to select and top at pullover locations which would result in the autonomous vehicle encroaching on a bicycle lane when no lower cost potential pullover location is available.

Figure 14:
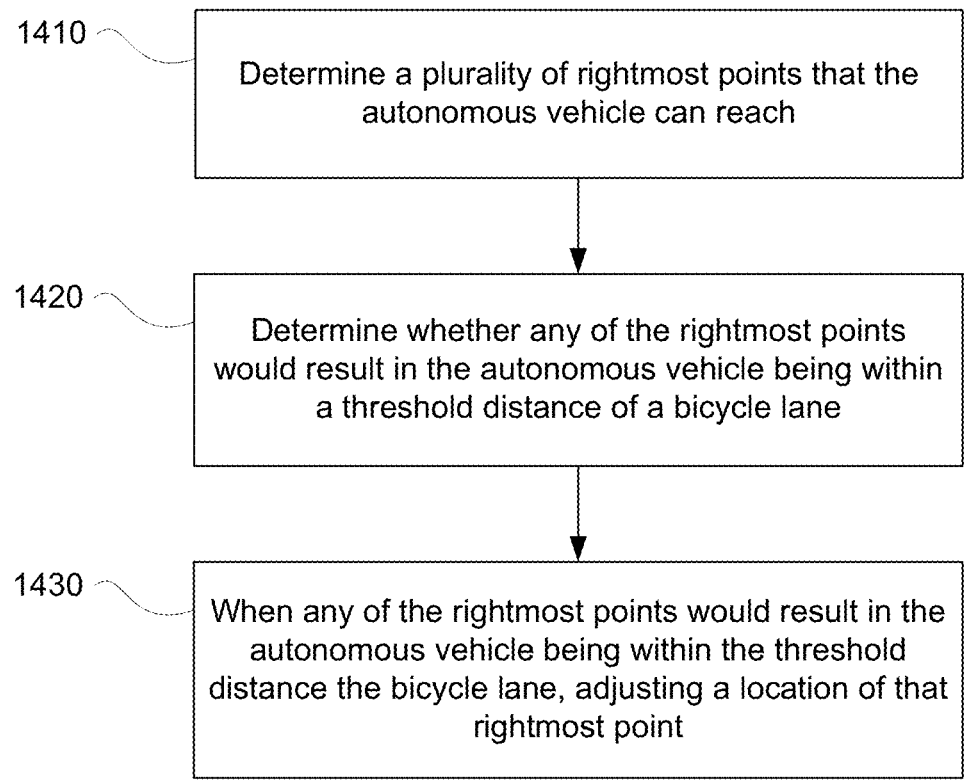
FIG. 14 is an example flow diagram in accordance with aspects of the disclosure.

In some instances, the transportation service may desire to avoid stopping in bicycle lanes altogether. FIG. 14 provides an example flow diagram 1400 for identifying a set of potential pullover locations corresponding to block 1210 in FIG. 12. In this regard, FIG. 14 is provided as an alternative to FIG. 13. For example, at block 1410, a plurality of rightmost points that the autonomous vehicle can reach are determined. As in the example of block 1310, for each predetermined distance interval, the computing devices 110 may identify a rightmost point to which the autonomous vehicle could drive and stop. In this regard, the actual location of this rightmost point may be determined based on the capabilities and dimensions of individual autonomous vehicles and may define a right offset value measured from a center of a lane (e.g., a right-most lane). Alternatively, the right offset value may be measured from the edge of a drivable road surface (e.g., the edge of a parking lane, paved surface, curb, shoulder area, etc.). Such capabilities may include, for example, turning radius, dimensions including length and width, software and hardware configurations, limits on how close the autonomous vehicle can come to other objects while moving, limits on how close the autonomous vehicle can come to other objects while stopped (e.g., additional distance may be needed to open the autonomous vehicle's doors when stopped), etc. The position of the autonomous vehicle when stopped at the rightmost point may be measured relative to a point on the autonomous vehicle, such as the center of the autonomous vehicle's rear axle or some other location. As such, in some instances, such as where there are other parked vehicles, the rightmost point may be within a driving lane (i.e., double parking), within a parking lane, or at locations therebetween.

Again, each rightmost point may be determined by the computing devices 110 by finding a geometry the autonomous vehicle can achieve at each predetermined distance interval (i.e., one geometry for each rightmost point). Alternatively, the rightmost points may be determined by first finding a right-most geometry that the autonomous vehicle can follow and thereafter iterating along the right-most geometry at the predetermined distance intervals to find each rightmost point. In this example, the predetermined distance intervals may be measured along the rightmost driving lane as in the example above or alternatively may be measured along the rightmost geometry.

Returning to block 1420 of FIG. 14, whether any of the rightmost points would result in the autonomous vehicle being within a threshold distance of a bicycle lane is determined. The computing devices 110 may determine if each rightmost point for each predetermined distance would result in any portion of the autonomous vehicle being within a threshold distance of a bicycle lane. If not, the rightmost point may be included in the set of potential pullover locations. If so, the autonomous vehicle's computing devices may simply adjust that rightmost point. For example, if the rightmost point is to the left of the bicycle lane and would result in a right lateral edge of the autonomous vehicle being more than the threshold distance from a leftmost edge (e.g., either an inside or outside edge of a lane line boundary defining the leftmost edge) of the bicycle lane, then the rightmost point may be included in the set of potential pullover locations. In addition, if the rightmost point is to the right of the bicycle lane and would result in a left lateral edge of the autonomous vehicle being more than the threshold distance from a leftmost edge (e.g., either an inside or outside edge of a lane line boundary defining the rightmost edge) of the bicycle lane, then the rightmost point may be included in the set of potential pullover locations. If not, the rightmost point may be adjusted to at least the threshold distance to the left of the bicycle lane as discussed further below.

Figure 15:
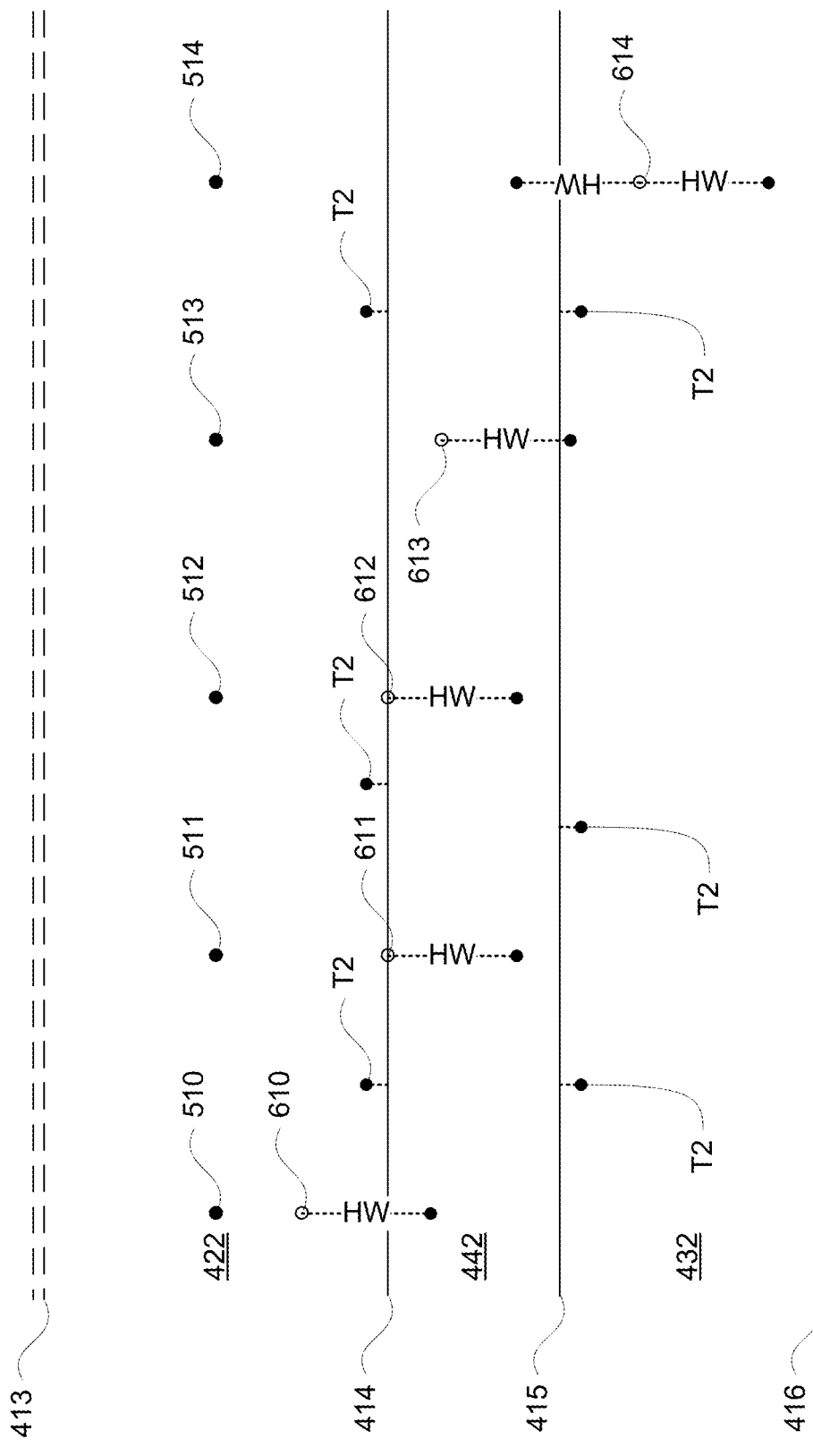
FIG. 15 is a detail view of a bicycle lane, rightmost points, a half-width of an autonomous vehicle, and a threshold in accordance with aspects of the disclosure.

FIG. 15 is an example detail view 1500 of bicycle lane 442 and depicts (as an example) rightmost points 610, 611, 612, 613, 614 as well as half-width (HW) distances of an autonomous vehicle 100 with respect to such rightmost points. In the example of rightmost points 610, 611, 612, 613, the half width distances extend into the bicycle lane 442. In this example, a threshold distance T2 is represented with respect to each of the edges of the bicycle lane 442. In this regard, T2 may be implemented as a negative value on the left edge of the bicycle lane and a positive value on the right edge of the bicycle lane, but in either case may be a non-zero value. As depicted, rightmost points 610, 611, 612, 613 are either within the bicycle lane or would result in a right lateral edge of the autonomous vehicle (measured based on the half width distance HW as well as the orientation/angle for autonomous vehicle 100 with respect to the lane or road edge) being less than the threshold distance T2 from the bicycle lane (measured from the leftmost edge). In this example, the rightmost point 614 would also result in a left lateral edge of the autonomous vehicle (measured based on the half width distance HW for autonomous vehicle 100) being less than the threshold distance T2 from the rightmost edge (bicycle lane edge 415). Accordingly, each of the rightmost points 610, 611, 612, 613, 614 may be determined to result in the autonomous vehicle being within a threshold distance of bicycle lane 442.

The threshold distance T2 may be set based upon the autonomous vehicle door span (e.g., lateral distance relative to the autonomous vehicle 100 when doors are opened), the goals of the transportation system, characteristics of the autonomous vehicles, and other considerations. For instance, for autonomous vehicles with typical doors which pivot open laterally (e.g., typical car doors), the desired threshold distance T2 may be greater than for autonomous vehicles with sliding doors (e.g., minivan doors) where less lateral clearance may be needed. This, in combination with notifications to passengers within an autonomous vehicle who will be exiting the autonomous vehicle, may help to reduce instances of opening a door into and/or causing a conflict (e.g., an actual collision or near collision) with a bicyclist. As another instance, legal requirements (e.g., local or regional traffic laws or rules) for stopping in bicycle lanes may require greater amounts of or even completely unblocked bicycle lanes.

Figure 16:
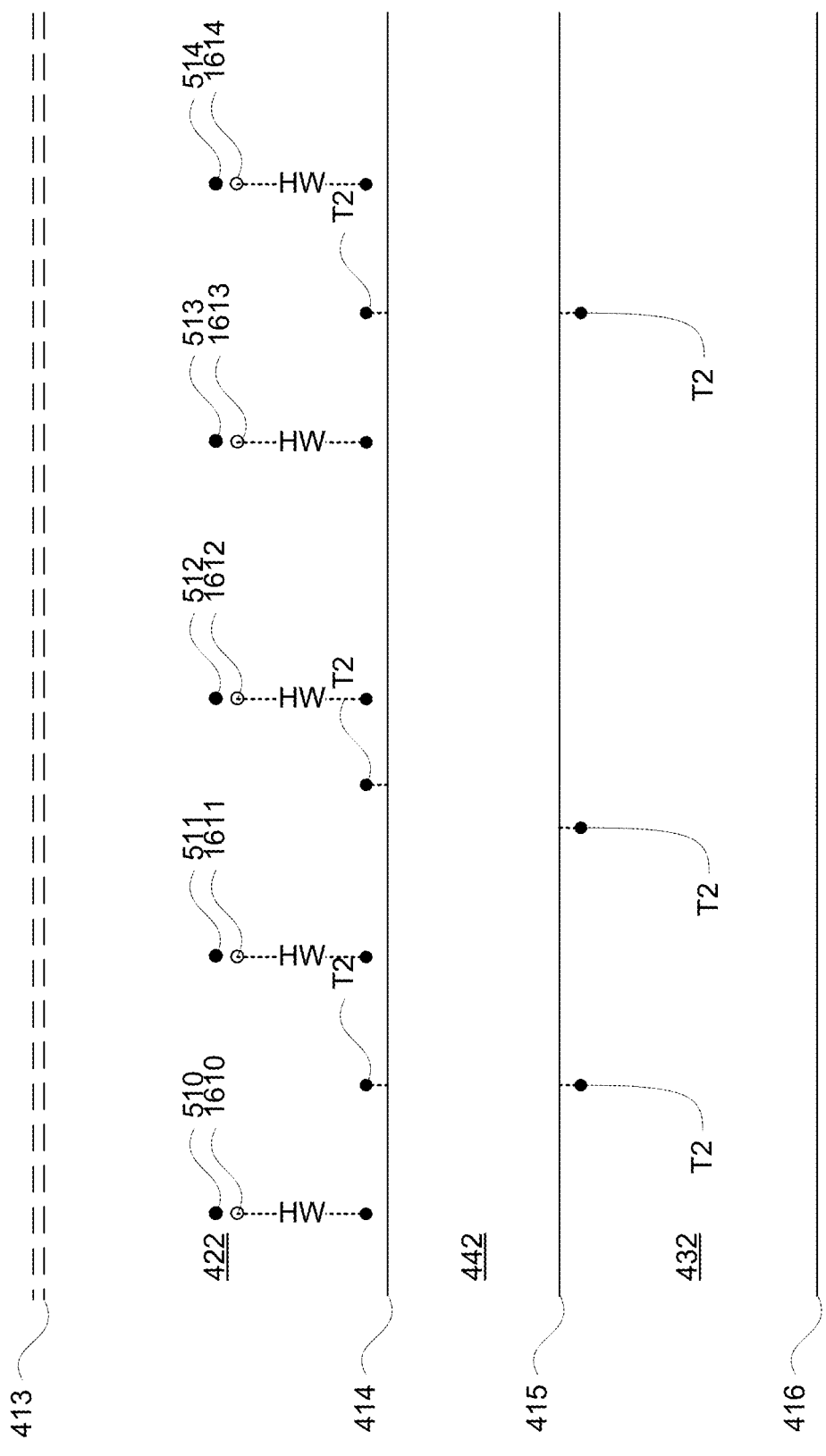
FIG. 16 is a detail view of a bicycle lane, rightmost points, adjusted points, a half-width of an autonomous vehicle, and a threshold in accordance with aspects of the disclosure.

Returning to block 1430 of FIG. 14, when any of the rightmost points would result in the autonomous vehicle within a threshold distance of the bicycle lane, a location of that rightmost point is adjusted. For instance, if the rightmost point would result in the left or right edges of the autonomous vehicle being is with the threshold distance of one or both of the right and left-most edges of the bicycle lane, then the location of this rightmost point may be adjusted leftward (e.g., back towards the rightmost driving lane) until the adjusted point is greater than the threshold distance of the leftmost edge. Returning to FIG. 8, each of the rightmost points 610, 611, 612, 613, 614 may be determined to result in the autonomous vehicle being within the threshold distance of a bicycle lane 442 and may therefore be adjusted to the locations of adjusted points 1610, 1611, 1612, 1613, 1614, respectively as shown in FIG. 16.

In this regard, the right offset values for any adjusted points will be decreased (e.g., when measured from the center of a lane). In other words, the lateral distances from the center of driving lane 422 for each of the adjusted points 1610, 1611, 1612, 1613, 1614 is less than the lateral distances from the driving lane 422 each of the rightmost points 610, 611, 612, 613, 614, respectively. Any adjusted points may then be included in the set of potential pullover locations. As such, adjusted points 1610, 1611, 1612, 1613, 1614, may be included in the set of potential pullover locations, and the rightmost points 610, 611, 612, 613, 614 would not. Thus, the computing devices 110 may iterate through each of the rightmost points, including those not depicted in FIGS. 15 and 16 (e.g., right most points 615, 616, 617, 618, 619, 620, 621).

In this regard, if at any of the rightmost points within the threshold distance of the destination would result in the autonomous vehicle being too close to the bicycle lane, then the autonomous vehicle would not stop at those rightmost points. Rather, the rightmost point is adjusted to a new location where the autonomous vehicle would not be too close to the bicycle lane (e.g., more than the threshold distance from the left bicycle lane edges). For example, FIG. 17 depicts an example of a set of potential pullover locations (for the examples of FIGS. 15 and 16) including the adjusted points 1610, 1611, 1612, 1613, 1614, rightmost points 615, 616, as well as adjusted points 1717, 1718, 1719, 1720, 1721 (corresponding to adjusted locations for each of rightmost points 618, 619, 620, 621, respectively).

Returning to block 1220 of FIG. 12, one of the set of potential pullover locations is selected by assessing a cost of each potential pullover location of the set of potential pullover locations. The set of potential pullover locations may be analyzed in order to select an actual pullover location for the autonomous vehicle to stop. For instance, each potential pullover location may be analyzed using a typical cost-based assessment for selecting a pullover location. For example, the assessment may include determining and aggregating a plurality of costs for various characteristics of the potential pullover location. Such characteristics may include an achievable lateral offset from an object (e.g., how close the autonomous vehicle is allowed to get to an object such as a curb), distance to the destination (e.g., linear distance, walking distance to the destination, type of pullover location (e.g., parking spot vs double parking), inconvenience to other road users, and so on. The pullover location having the lowest cost may then be selected for the actual pullover location.

Figure 17:
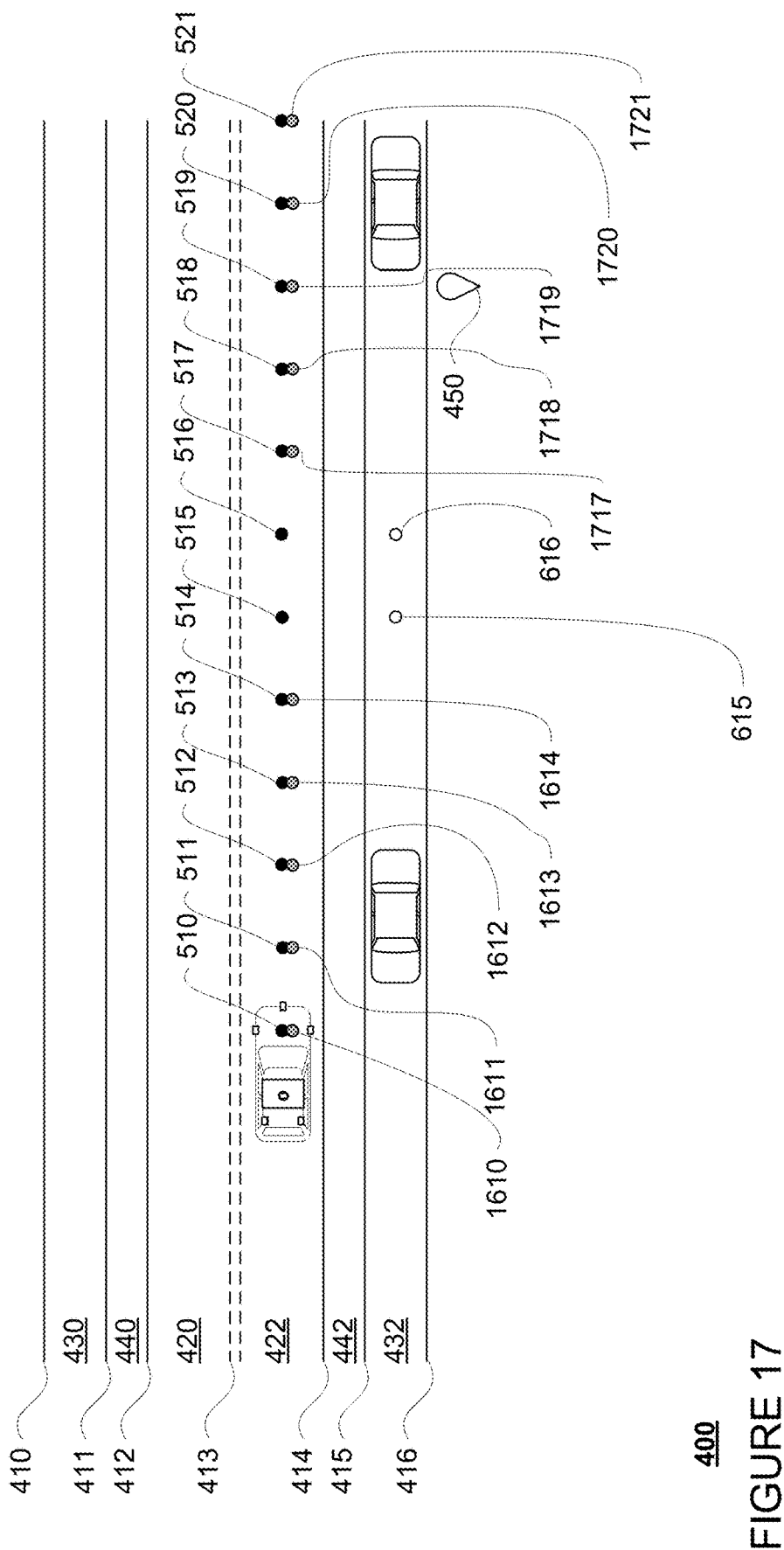
FIG. 17 is an example of a set of potential pullover locations in accordance with aspects of the disclosure.

For example, after evaluating the costs of all of the pullover locations of the set (as depicted in FIG. 17), the computing devices 110 in this example, may have determined that the rightmost point 615 has the lowest cost among the rightmost points 615, 616 and the adjusted points 1610, 1611, 1612, 1613, 1614, 1718, 1719, 1720, 1721. In this example, the computing devices 110 in this example, may have determined that the rightmost point 615 has the lowest cost among rightmost points 610, 614, 615, 616, 617 and adjusted points 911, 912, 913, 1018, 1019, 1020, 1021. Thus, rightmost point 615 is selected as the pullover location. In this regard, the selected pullover location is also the pullover location of 1110 in FIG. 11. However, if the rightmost point 615 has a higher cost for some other reason, for instance because it becomes occupied by another object (e.g., a pedestrian), then one of the adjusted points 911, 912, 913, 1018, 1019 may be selected.

Returning to block 1230 of FIG. 12, the autonomous vehicle is controlled to stop at the selected one. For instance, the actual pullover location may be set at the destination for the autonomous vehicle, and the autonomous vehicle may be controlled to reach this destination as described above. In this regard, the autonomous vehicle is controlled according to the right offset of the selected pullover location. Thus, referring back to FIG. 11, the autonomous vehicle 100 may be controlled by the computing devices according to the right offset value of the rightmost point 615 (or an alternative rightmost point). For example, the routing system 170 may plan a route 1120 in order for the autonomous vehicle to reach the pullover location 1110, and the planning system 168 may use this route to plan trajectories in order to stop the autonomous vehicle at the pullover location.

Although the features above relate to right-hand parking in right-hand drive jurisdictions or situations, similar features, though reversed, may also be utilized for left-hand parking (e.g., on a one-way street) left-hand drive jurisdictions or situations with bicycle lanes. For example, the features above may be utilized in a left-hand drive jurisdiction by simply swapping references to right and left (e.g., right most point becomes left most point), and so on.

The features described herein may better enable autonomous vehicles to better account for bicycle lanes when identifying and selecting pullover locations. For instance, an autonomous vehicle is able to find and use potential pullover locations which provide a desired amount of unblocked bicycle lanes and/or completely avoid bicycle lanes rather than those that simply completely block bicycle lanes. In addition, when assessing costs, an encroachment cost may be used to further this benefit by discouraging selection of pullover locations which would result in the autonomous vehicle encroaching on bicycle lanes while at the same time still allowing for them. In addition, the features described herein may allow the autonomous vehicle's computing devices to recognize that staying on the left (rather than as far right as possible) in such locations may be the overall best location. As such, an autonomous vehicle may be better able to find reasonable locations to stop to pick up and/or drop off passengers. Thus, these features may be particularly useful in more urban areas where available pullover locations can be scarce.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
    identifying, by one or more processors, a set of potential pullover locations for an autonomous vehicle;
    determining, for a potential pullover location of the set of potential pullover locations, by the one or more processors, a rightmost point at which the autonomous vehicle can stop;
    determining, by the one or more processors, whether stopping the autonomous vehicle at the rightmost point results in the autonomous vehicle encroaching on a bicycle lane;
    based at least on a determination that stopping the autonomous vehicle at the rightmost point results in the autonomous vehicle encroaching on the bicycle lane, determining whether to adjust a location of the rightmost point by determining a location of a lateral edge of the autonomous vehicle if the autonomous vehicle was stopped at the rightmost point and determining whether the location of the lateral edge of the autonomous vehicle is within a threshold distance of an edge of the bicycle lane;
    based at least on a determination of whether to adjust the location of the rightmost point, selecting, by the one or more processors, one of the set of potential pullover locations; and
    controlling, by the one or more processors, the autonomous vehicle to stop at the selected one.

2. The method of claim 1, wherein the rightmost point corresponds to a center of a rear axle of the autonomous vehicle, and wherein determining whether stopping the autonomous vehicle at the rightmost point results in the autonomous vehicle encroaching on the bicycle lane includes adding a half-width of the autonomous vehicle to the rightmost point.

3. The method of claim 1, wherein determining the location of the lateral edge of the autonomous vehicle includes adding a half-width of the autonomous vehicle to the rightmost point.

4. The method of claim 1, further comprising, based at least on the determination of whether to adjust the location of the rightmost point includes adjusting the location of the rightmost point to an adjusted location within the threshold distance of the edge of the bicycle lane.

5. The method of claim 4, further comprising, including the adjusted location in the set of potential pullover locations.

6. The method of claim 1, wherein the edge of the bicycle lane is an inside edge.

7. The method of claim 1, wherein the edge of the bicycle lane is an outside edge.

8. The method of claim 1, further comprising, based at least on a determination of whether stopping the autonomous vehicle at the rightmost point results in the autonomous vehicle encroaching on the bicycle lane, assessing, by the one or more processors, an encroachment cost to the potential pullover location.

9. The method of claim 8, wherein the encroachment cost goes to zero when there is no encroachment on the bicycle lane.

10. The method of claim 8, wherein the encroachment cost is based at least on a width of the bicycle lane.

11. The method of claim 10, wherein the encroachment cost is further based on a desired portion of the width of the bicycle lane that is to remain unblocked by the autonomous vehicle.

12. The method of claim 10, wherein the encroachment cost is further based on an amount of encroachment on the bicycle lane.

13. A system comprising one or more processors configured to:
    identify a set of potential pullover locations for an autonomous vehicle;
    determine, for a potential pullover location, a rightmost point at which the autonomous vehicle can stop;
    determine whether stopping the autonomous vehicle at the rightmost point results in the autonomous vehicle encroaching on a bicycle lane;
    based at least on a determination that stopping the autonomous vehicle at the rightmost point results in the autonomous vehicle encroaching on the bicycle lane, determine whether to adjust a location of the rightmost point based at least on a determination of a location of a lateral edge of the autonomous vehicle if the autonomous vehicle was stopped at the rightmost point and a determination of whether the location of the lateral edge of the autonomous vehicle is within a threshold distance of an edge of the bicycle lane;
    based at least on a determination of whether to adjust the location of the rightmost point, select one of the set of potential pullover locations; and
    control the autonomous vehicle to stop at the selected one.

14. The system of claim 13, wherein the one or more processors are further configured to, based at least on the determination of whether to adjust the location of the rightmost point, adjust the location of the rightmost point to an adjusted location within the threshold distance of the edge of the bicycle lane.

15. The system of claim 14, wherein the one or more processors are further configured to include the adjusted location in the set of potential pullover locations.

16. The system of claim 13, wherein the one or more processors are further configured to, based at least on a determination of whether stopping the autonomous vehicle at the rightmost point results in the autonomous vehicle encroaching on the bicycle lane, assess an encroachment cost to the potential pullover location.

* * * * *